Figure 1:
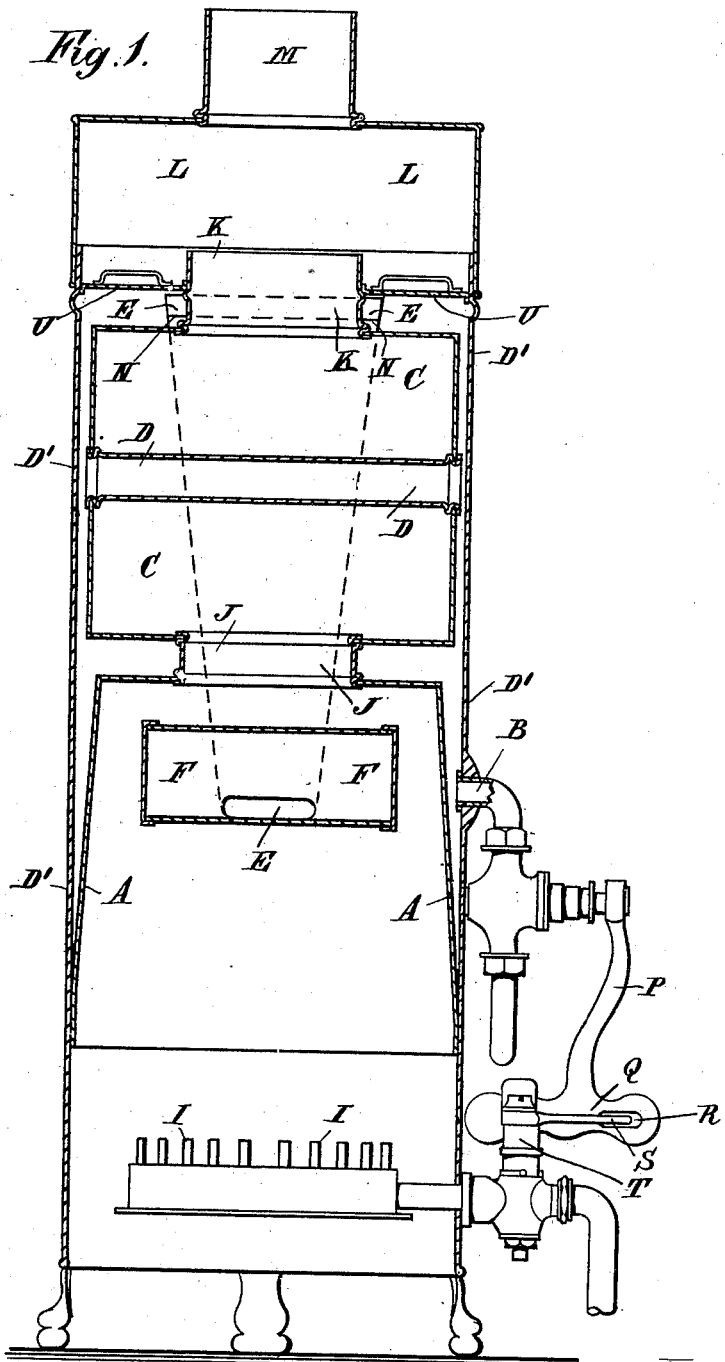

No. 663,745. Patented Dec. 11, 1900.
H. T. FENLON.
GEYSER OR LIKE WATER HEATER.
(Application filed July 31, 1900.)
(No Model.) 5 Sheets—Sheet 1.

Witnesses
Inventor
Henry T. Fenlon
by James L. Norris
atty

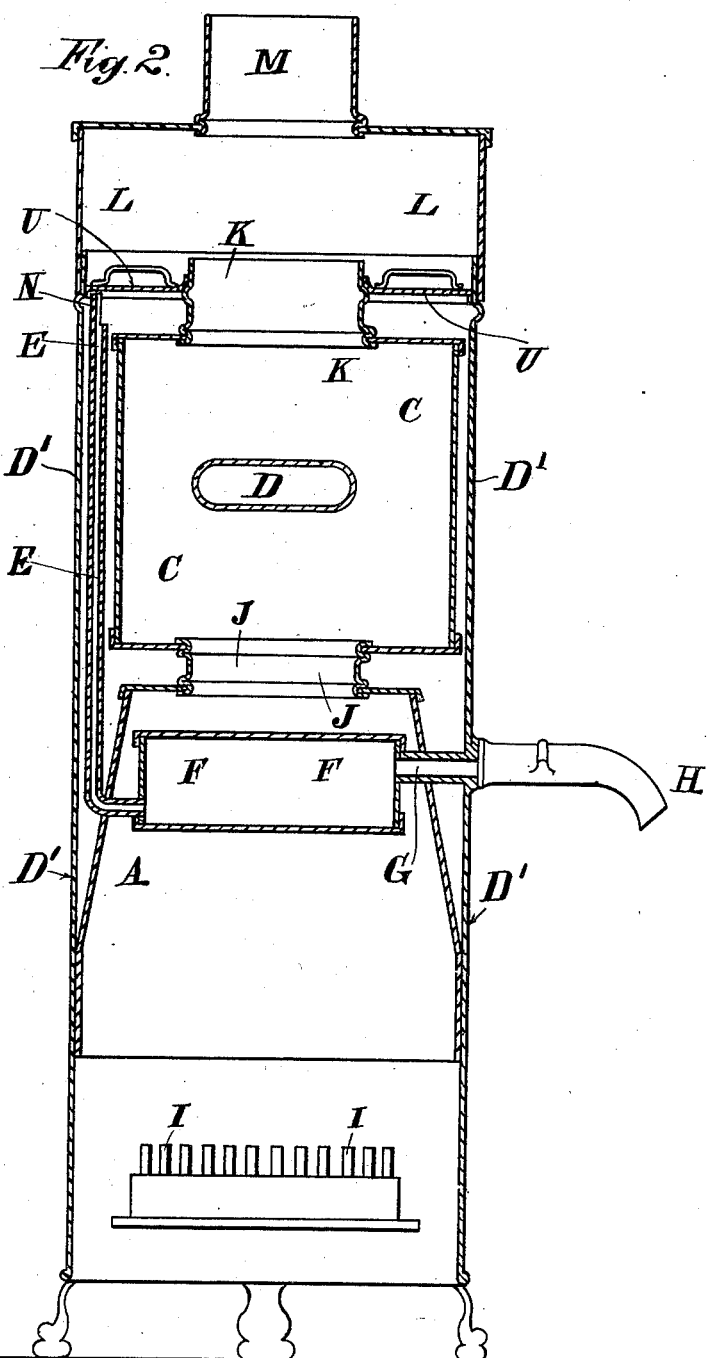

No. 663,745. Patented Dec. 11, 1900.
H. T. FENLON.
GEYSER OR LIKE WATER HEATER.
(Application filed July 31, 1900.)
(No Model.) 5 Sheets—Sheet 3.
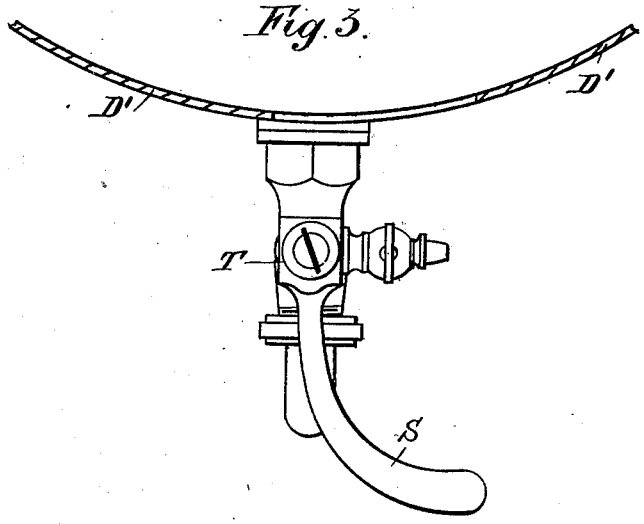
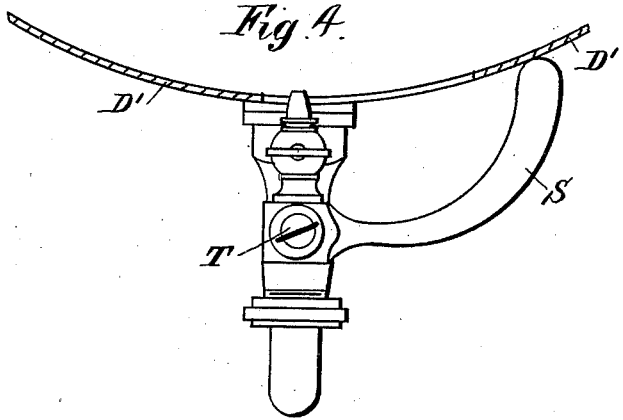

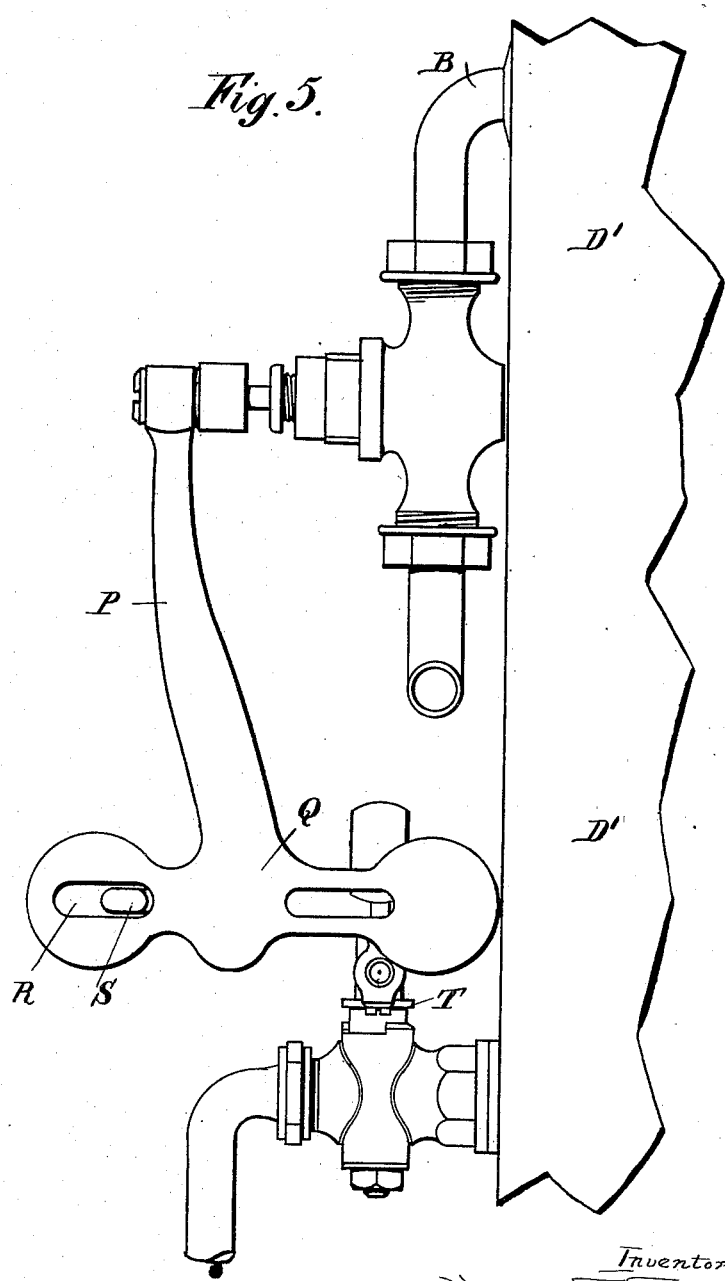

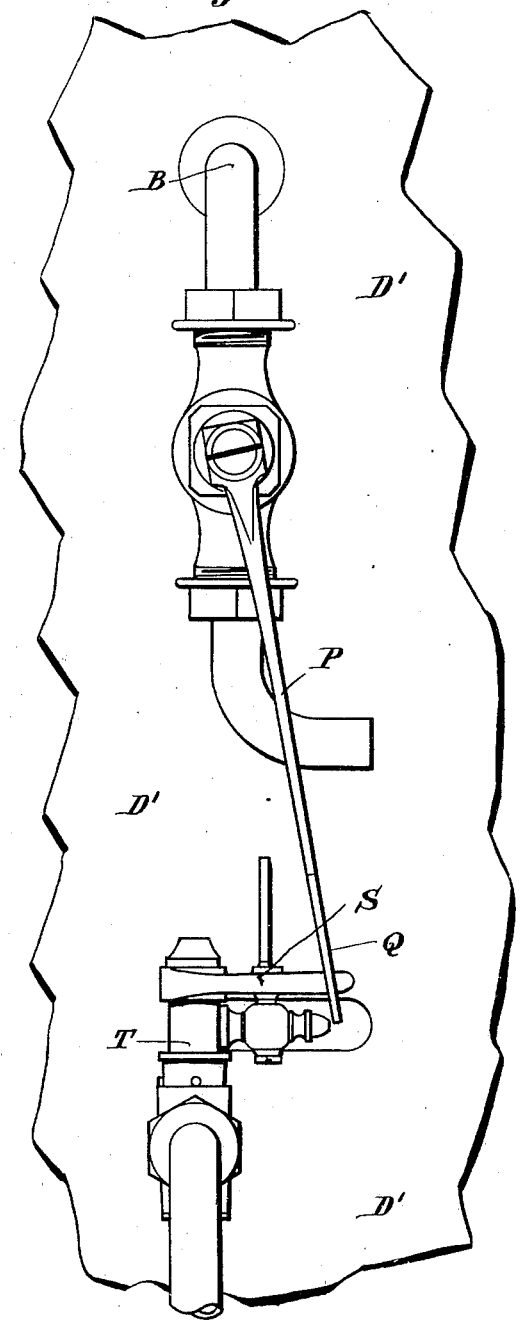

UNITED STATES PATENT OFFICE.

HENRY THOMAS FENLON, OF LONDON, ENGLAND.

GEYSER OR LIKE WATER-HEATER.

SPECIFICATION forming part of Letters Patent No. 663,745, dated December 11, 1900.

Application filed July 31, 1900. Serial No. 25,446. (No model.)

*To all whom it may concern:*

Be it known that I, HENRY THOMAS FENLON, a subject of the Queen of Great Britain, residing at 8 Tudor street, in the city of London, England, have invented certain new and useful Improvements in and Connected with Geysers or Like Water-Heaters, of which the following is a specification.

This invention relates to improvements in and connected with geysers and like water-heaters whereby the water is heated by the uprising products of combustion as it enters the apparatus and is heated to a greater extent by the flames from the burner at a point near the outlet, so that greater efficiency is insured, the water circulating in its passage through the apparatus, and thereby partaking of the heat on its travel. The taps and valves are so constructed whereby it is impossible for the gas valve or tap to be turned on unless the water valve or tap is open, and it is also impossible for the water valve or tap to be turned off unless the gas-supply is cut off.

My invention will be understood from the following description, aided by the accompanying drawings, in which—

Figure 1 is a longitudinal section of a complete geyser with the water and gas taps in elevation. Fig. 2 is a longitudinal section of a complete geyser at right angles to that shown in Fig. 1, the nozzle or outlet being shown in elevation. Fig. 3 is a plan of the gas-tap and pilot-burner when closed and showing the construction of the handle. Fig. 4 is a plan of the gas-tap and pilot-burner when open and in position for lighting the geyser-burner. Fig. 5 is a longitudinal side elevation of the gas and water taps and showing the construction of the water-tap handle. Fig. 6 is a longitudinal front elevation of the gas and water taps, showing the position the handles occupy when both gas and water are shut off.

In carrying out my invention I construct the geyser or like water-heater with a cone or other shaped base A, into which the water enters from the inlet B and passes upward in the apparatus and around a box or chamber C, which is provided with a cross-tube D, and between such chamber C and the casing D' until it reaches the top of the chamber C, from whence it flows down a passage or pipe E to a circulating-boiler F (fitted below the box C and within the cone A) and away by the pipe G to the outlet H.

The boiler F is situated just above the burners I, and the heat from same is first imparted to such boiler, around which it passes, and up through the tube J, which connects the dome of the cone A and the chamber C together, and into the chamber C and away by the tube K and the dome L to the outlet M, which outlet M may be conducted to the exterior of the building, and thus prevent noxious and injurious fumes from the burner entering the room in which the geyser is situated.

The entrance to the passage or pipe E is provided with a lip N, which projects above the chamber and insures a film of water always being in contact with the top of the chamber C during the action of the geyser, so that such water gets further heated before passing by the pipe E to the circulating-boiler F for final heating.

The gas-valve carries a pilot-burner which is turned on and lighted before the gas to the burner I is turned on, and the water-tap handle P is provided with right-angled extensions Q, one having a hole R therein for reception of the curved handle S of the gas-tap T when the gas has been turned off, the water only being turned off when the hole R of the extension Q has embraced the gas-tap handle S, so that it will be understood that it is impossible to turn on the gas by the handle S until the handle P has been operated to institute a supply of water and by reason of the extension or cross-piece Q abutting against the handle S when the gas-tap T is not fully closed the water-tap be prevented from being closed. Thus should the gas be alight there is always water passing through the apparatus, and in consequence all danger and burning of the apparatus are avoided.

The arrangement of the handle S is such that when in the position indicated in Fig. 4 or at any position between that and the position shown at Fig. 3 the extension Q will abut against the handle S and prevent the closing of the water-tap until the handle S is placed in the position at Fig. 3, when the hole in the extension Q will embrace the handle S. The position of the handle S in Fig. 3 is that when the gas-tap is closed, and the position shown in Fig. 4 is that when the gas-tap is open, or, in other words, moving the handle S toward the casing D' opens the gas-tap, while the movement in an opposite direction closes the same. Therefore, as before stated, when the handle S is in the position shown in Fig. 4 the extension Q will abut against same, the handle S thus preventing the closing of the water-tap by arresting the movement of the extension Q.

U is a cover fitted in the head of the geyser and prevents the fumes of the gas from contaminating the water and, being somewhat loosely fitted, allows escape of steam, which, with the products of combustion, collects in the dome L and passes away by the outlet M to the atmosphere.

By this invention a great space is afforded for the heat from the gas or oil flame and the products of combustion to act upon the walls of the apparatus, and by reason of the water passing through the apparatus and around the cone and chamber in a thin film the heat is quickly imparted to the water, which readily partakes of same, so that when it reaches the boiler F, which is situated in the immediate vicinity of the flame, the water is in condition for readily absorbing the great heat at that part, and consequently leaves the geyser at a temperature greatly above that at the top of the geyser.

What I claim, and desire to secure by Letters Patent, is—

1. In a water-heater, the combination with a casing, of a base mounted therein, a chamber arranged above said base and provided with a cross-tube D, connections between said base and chamber, a circulating-boiler arranged in said base, an outlet therefor, and a suitable pipe connection between the top of said chamber and said boiler, substantially as set forth.

2. In a water-heater, the combination with a casing, of a base mounted therein and forming a water-space in communication with a water-supply, a gas-burner arranged in said casing below said base and in communication with a source of gas-supply, a chamber mounted in said casing above said base and forming a continuation of the water-space, a cross-tube extending through said chamber and in communication at each end with said water-space, a suitable connection between said chamber and base, a circulating-boiler mounted in the base, a suitable connection between the top of said water-space and said boiler, and an outlet for the said boiler.

3. In a water-heater, the combination with a casing, of a base mounted therein and forming a water-space in communication with a water-supply, a gas-burner arranged in said casing below said base, and in communication with a source of gas-supply, a chamber mounted in said casing above said base and forming a continuation of the water-space, a cross-tube extending through said chamber and in communication at each end with said water-space, a suitable connection between said chamber and base, a circulating-boiler mounted in the base, a suitable connection between the top of said water-space and said boiler, an outlet for said boiler, and means for simultaneously supplying and cutting off the water to said water-space and gas to said burner, substantially as set forth.

4. In a water-heater, a casing, a cone-shaped base arranged therein, a chamber in communication at its lower end with said base and at its upper end provided with an outlet, a tube extending through the said chamber, a circulating-boiler arranged in said base and provided with a suitable outlet, and a connection provided at its upper end with a lip and in suitable communication between the top of said chamber and said boiler.

5. In a water-heater, a casing, a base mounted therein above a gas-burner and surrounded by a water-space connected to a source of supply, a chamber arranged in said casing, in communication at one end with said base to receive the products of combustion therefrom and forming a continuation of said water-space, an outlet connected to said chamber for the products of combustion, a tube extending across said chamber and in communication at each end with said water-space and adapted to have the water circulating therethrough to be heated by the products of combustion as they arise within the chamber, a water-circulating boiler arranged in the said base and adapted to be heated by the products of combustion before entering said chamber, a suitable connection between the top of said water-space in said boiler for supplying water to the latter, and a suitable outlet for said boiler.

6. In a water-heater, a casing, a base mounted therein above a gas-burner and surrounded by a water-space connected to a source of supply, a chamber arranged in said casing, in communication at one end with said base to receive the products of combustion therefrom and forming a continuation of said water-space, an outlet connected to said chamber for the products of combustion, a tube extending across said chamber and in communication at each end with said water-space and adapted to have the water circulating therethrough to be heated by the products of combustion as they rise within the chamber, a water-circulating boiler arranged in the said base and adapted to be heated by the products of combustion before entering said chamber, a suitable connection between the top of said water-space in said boiler for supplying water to the latter, a suitable outlet for said boiler, and means for supplying and cutting off gas to said burner and water to said water-space.

7. In a water-heater, the combination with a casing, of a base mounted therein, a chamber arranged above said base and provided with a cross-tube D, connections between said base and chamber, a circulating-boiler arranged in said base, an outlet therein, a suitable pipe connection between the top of said casing and said boiler, a water-supply tap suitably connected to said casing, a gas-supply valve suitably connected to said casing, and a suitable connection between the said valve and tap for simultaneously operating one with the other.

8. In a water-heater, the combination with a casing, of a base mounted therein, a chamber arranged above said base and provided with a cross-tube D, connections between said base and said chamber, a circulating-boiler arranged in said base, an outlet therefor, a suitable pipe connection between the top of said casing and said boiler, a gas-supply valve connected to said casing, a curved arm secured thereto for operating the same, a water-supply tap connected to said casing and provided with a suitable extension, and means carried by the said extension and engaging said arm for operating said gas-supply valve simultaneously with the operation of the water-tap.

In testimony whereof I have hereunto set my hand in presence of two subscribing witnesses.

HENRY THOMAS FENLON.

Witnesses:
PERCY E. MATTOCKS,
IRENEO FRANCO VELHO.